US007984111B2

(12) United States Patent
Karaoguz et al.

(10) Patent No.: US 7,984,111 B2
(45) Date of Patent: Jul. 19, 2011

(54) SOFTWARE APPLICATIONS INCORPORATING FUNCTIONALITIES BASED ON DATA-TYPE AND ACCESS

(75) Inventors: Jeyhan Karaoguz, Irvine, CA (US); Nambi Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2859 days.

(21) Appl. No.: 10/301,918

(22) Filed: Nov. 22, 2002

(65) Prior Publication Data

US 2004/0059794 A1    Mar. 25, 2004

Related U.S. Application Data

(60) Provisional application No. 60/410,004, filed on Sep. 12, 2002.

(51) Int. Cl.
*G06F 15/16* (2006.01)
(52) U.S. Cl. .................................. 709/217; 709/229
(58) Field of Classification Search .................. 709/217, 709/229
See application file for complete search history.

(56) References Cited

U.S. PATENT DOCUMENTS

| 6,684,088 | B1 * | 1/2004 | Halahmi ........................ 455/566 |
| 6,891,810 | B2 * | 5/2005 | Struhsaker et al. ............ 370/294 |
| 6,934,745 | B2 * | 8/2005 | Krautkremer .................. 709/223 |
| 2002/0016818 | A1 * | 2/2002 | Kirani et al. .................. 709/203 |

OTHER PUBLICATIONS

"IEEE 802.11, A Technical Overview," Pablo Brenner, BreezeNet website, Jul. 8, 1997, www.sss-mag.com/pdf/80211p.pdf.
Donny Jackson, Telephony, Ultrawideband May Thwart 802.11, Bluetooth Efforts, PRIMEDIA Business Magazines & Media Inc., Feb. 11, 2002.
Daniel L. Lough, et al., "A Short Tutorial on Wireless LANs and IEEE 802.11," The IEEE Computer Society's Student Newsletter, Virginia Polytechnic Institute and State University, Summer 1997, vol. 5, No. 2.
Dr. Robert J. Fontana, "A Brief History of UWB Communications," Multispectral.com, Multispectral Solutions, Inc., www.multispectral.com/history.html, Aug. 20, 2002.
Gerald F. Ross, "Early Motivations and History of Ultra Wideband Technology," Anro Engineering, Inc., Multispectral.com, Multispectral Solutions, Inc., www.multispectral.com/history.html, Aug. 20, 2002.
Dr. Terence W. Barrett, "History of UltraWideband (UWB) Radar & Communications: Pioneers and Innovators," Proceedings and Progress in Electromagnetics Symposium 2000 (PIERS2000), Cambridge, MA, Jul. 2000.
Dr. Henning F. Harmuth, "An Early History of Nonsinusoidal Electromagnetic Technologies," Multispectral.com, Multispectral Solutions, Inc., www.multispectral.com/history.html, Aug. 20, 2002.

(Continued)

*Primary Examiner* — Kevin Bates
*Assistant Examiner* — Oleg Survillo
(74) *Attorney, Agent, or Firm* — McAndrews, Held & Malloy, Ltd.

(57) ABSTRACT

A process of sending and receiving data by a wireless device through a wireless network is disclosed. Access criteria are set for at least one of the wireless device and applications running on the wireless device. At least one query is formulated by one of the applications running on the wireless device and the query is sent over the wireless network. Data is received in response to the query, wherein the data received is based on the access criteria and the access criteria relate to an access of the wireless device to the wireless network.

28 Claims, 4 Drawing Sheets

OTHER PUBLICATIONS

Rebecca Taylor, "Hello, 802.11b AND Bluetooth: Let's Not Be Stupid!", ImpartTech.com, www.ImportTech.com/802.11-bluetooth.htm, Aug. 21, 2002.

Matthew Peretz, "802.11, Bluetooth Will Co-Exist: Study," 802.11-Planet.com, INT Media Group, Inc., Oct. 30, 2001.

"Bluetooth and 802.11: A Tale of Two Technologies," 10Meters.com, www.10meters.com/blue_802.html, Dec. 2, 2000.

Keith Shaw, "Bluetooth and Wi-Fi: Friends or foes?", Network World Mobile Newsletter, Network World, Inc., Jun. 18, 2001.

Joel Conover, "Anatomy of IEEE 802.11b Wireless," NetworkComputing.com, Aug. 7, 2000.

Bob Brewin, "Intel, IBM Push for Public Wireless LAN," Computerworld.com, Computerworld Inc., Jul. 22, 2002.

Ernest Khoo, "A CNET tutorial: What is GPRS?", CNETAsia, CNET Networks, Inc., Feb. 7, 2002.

Les Freed, "Et Tu, Bluetooth?", ExtremeTech.com, Ziff Davis Media Inc., Jun. 25, 2001.

Bluetooth & 802.11b—Part 1, www.wilcoxonwireless.com/whitepapers/bluetoothvs802.doc, Jan. 2002.

Bob Brewin, "Report: IBM, Intel, Cell Companies Eye National Wi-Fi Net," Computerworld.com, Computerworld Inc., Jul. 16, 2002.

Bob Brewin, "Microsoft Plans Foray Into Home WLAN Device Market," Computerworld.com, Computerworld Inc., Jul. 22, 2002.

Bob Brewin, "Vendors Field New Wireless LAN Security Products," Computerworld.com, Computerworld Inc., Jul. 22, 2002.

Jeff Tyson, "How Wireless Networking Works," Howstuffworks.com, Howstuffworks, Inc., www.howstuffworks.com/wireless-network.htm/printable, Aug. 15, 2002.

Curt Franklin, "How Bluetooth Works," Howstuffworks.com, Howstuffworks, Inc., www.howstuffworks.com/bluetooth.htm/printable, Aug. 15, 2002.

802.11b Networking News, News for Aug. 19, 2002 through Aug. 11, 2002, 80211b.weblogger.com/, Aug. 11-19, 2002.

"Wireless Ethernet Networking with 802.11b, An Overview," HomeNetHelp.com, Anomaly, Inc., www.homenethelp.com/80211.b/index.asp, Aug. 20, 2002.

"Simple 802.11b Wireless Ethernet Network with an Access Point," HomeNetHelp.com, Anomaly, Inc., www.homenethelp.com/web/diagram/access-point.asp, Aug. 20, 2002.

"Simple 802.11b Wireless Ethernet Network without an Access Point," HomeNetHelp.com, Anomaly, Inc., www.homenethelp.com/web/diagram/ad-hoc.asp, Aug. 20, 2002.

"Cable/DSL Router with Wired and Wireless Ethernet Built In," HomeNetHelp.com, Anomaly, Inc., www.homenethelp.com/web/diagram/share-router-wireless.asp, Aug. 20, 2002.

"Bridging a Wireless 802.11b Network with a Wired Ethernet Network" HomeNetHelp.com, Anomaly, Inc., www.homenethelp.com/web/diagram/wireless-bridged.asp, Aug. 20, 2002.

"Wireless Access Point (802.11b) of the Router Variety," HomeNetHelp.com, Anomaly, Inc., www.homenethelp.com/web/diagram/share-wireless-ap.asp, Aug. 20, 2002.

Robert Poe, "Super-Max-Extra-Ultra-Wideband!", Business2.com, Oct. 10, 2000.

David G. Leeper, "Wireless Data Blaster," ScientificAmerican.com, Scientific American, Inc., May 4, 2002.

Steven J. Vaughan-Nichols, "Ultrawideband Wants to Rule Wireless Networking," TechUpdate.ZDNet.com, Oct. 30, 2001.

Jim Zyren and Al Petrick, "Brief Tutorial on IEEE 802.11 Wireless LANs," AN9829, Intersil Corporation, Feb. 1999.

"Overview of UWB?", PulseLink.net, Pulse~LINK, Inc., www.pulselink.net/ov_history.html, Sep. 4, 2002.

Robert X. Cringely, "The 100 Mile-Per-Gallon Carburetor—How Ultra Wide Band May (or May Not) Change the World," Interesting-People.org, Jan. 26, 2002.

William A. Kissick, Editor, "The Temporal and Spectral Characteristics of Ultrawideband Signals," NTIA Report 01-383, Jan. 2001, www.its.bldrdoc.gov/pub/ntia-rpt/01-383/.

"Ultra Wide Band," www.ida.gov.sg/Website/IDAContent.nsf/dd1521fle79ecf3bc825682f0045a349/1856626048baf403c82569880267e26%3FOpenDocument+%22Full+duplex+UWB+handheldtransceiver%22&h1=en&ie=UTF-8, Aug. 20, 2002.

* cited by examiner

SOFTWARE APPLICATIONS INCORPORATING FUNCTIONALITIES BASED ON DATA-TYPE AND ACCESS

This nonprovisional application claims the benefit of U.S. Provisional Application No. 60/410,004, filed Sep. 12, 2002. The contents of the provisional application are hereby incorporated by reference.

BACKGROUND OF THE INVENTION

1. Field of Invention

The present invention relates to devices, software applications and networks that utilize data that is sent or received over data communication or computer networks. The present invention further relates to devices, software applications and networks that control the type and amount of data sent and received based on certain access criteria. More specifically, the present invention is directed to wireless devices implementing software to access a network, where that access is modulated depending on the speed of the wireless network connection and/or the type of data being sent or received by the wireless devices.

2. Description of Related Art

As mobile devices have become more ubiquitous, the types of mobile access and the bandwidths that they support have multiplied. Thus, a mobile telephone may not only support the transmission and receipt of voice communication, but also transmission of data. Data transmission may not occur at the same data rate as the voice communication. Similarly, laptop computers may be equipped with wireless communication devices that may connect at different data rates depending on the wireless environment they reside. For example, in the case of IEEE 802.11 devices, the distance from the access point, that controls the wireless network, to the device determines the data rate at which packets can be exchanged between the device and the access point.

The variable data rates and the various types of data being exchanged over a network greatly affect what a user can do with the wireless device. For example, a user that is using the wireless device may wish to download a large file over the network to the wireless device only when there is sufficient bandwidth such that the download would occur in under a specific period of time. Similarly, the user may wish to download only the text portions of a web page if the user is transferring data over a slow connection so that the user doesn't have to wait for pictures to be downloaded before accessing the web page. At present, the wireless devices do not take into account the data rate or the data type when transferring data.

Another example is provided below illustrates the need for more responsive wireless devices that affect other portions of the network. When a user seeks to download a large file and it takes a long time to download, the other portions of the network often have to cache at least a portion of the large file while the wireless device is downloading it. This requires a greater amount of overhead for the network that would not be needed if the server from which the user is seeking information could send less data or forward data at a lower data rate.

As such, there is a need for a method or mechanism in the prior art that can optimize the access of a wireless device, depending on the speed of the wireless network connection and/or the type of data being sent or received by the wireless devices. In addition, there is also a need for a network that will accommodate the wireless devices and allow the devices to properly optimize access.

SUMMARY OF THE INVENTION

This invention seeks to overcome the drawbacks of the above-described conventional network devices and methods. The present invention is directed to software applications and systems that allow for controls to be placed on the type and amount of data received and sent based on access criteria. Those controls are important in that they allow the end user or the device to control the amount of data received from or sent to the wireless network that the system will process and display.

According to one aspect of this invention, a process of sending and receiving data by a wireless device through a wireless network is disclosed. Access criteria are set for at least one of the wireless device and applications running on the wireless device. At least one query is formulated by one of the applications running on the wireless device and the query is sent over the wireless network. Data is received in response to the query, wherein the data received is based on the access criteria and the access criteria relate to an access of the wireless device to the wireless network.

Alternatively, a wireless device register may be set based on the access of the wireless device to the wireless network and the at least one query is formulated based on contents of the wireless device register. Also, the process may also include reformulating the at least one query based on the access criteria and sending the reformulated query over the wireless network. In addition, the process may include setting the access criteria by a sender of data in response to the at least one query and receiving modified data, wherein the modified data is modified by the sender based on a detected access of the wireless device to the wireless network detected by the sender.

The process may include formulating at least one query by an email application, a browser application, a streaming media application, or a network messaging application. In the case of the email application, data received in response to the query is at least a portion of an email message based on the access criteria. The access criteria can be based on a data rate between the wireless device and the wireless network, based on a type of data transferred between the wireless device and the wireless network, based on a provider of network service providing the wireless network, or based on a use of the wireless device over a predetermined period of time. The process may further include setting access criteria for each application running on the wireless device separately, where those access criteria may be based on a use of each application running on the wireless device over a predetermined period of time.

According to another embodiment of this invention, a wireless device for sending and receiving data through a wireless network is disclosed. The wireless device includes setting means for setting access criteria for at least one of the wireless device and applications running on the wireless device, formulating means for formulating at least one query by one of the applications running on the wireless device, sending means for sending the query over the wireless network, and receiving means for receiving data in response to the query. The data received by the receiving means is based on the access criteria and the access criteria relate to an access of the wireless device to the wireless network.

In another embodiment, a wireless device for sending and receiving data through a wireless network is disclosed. The wireless device includes an access criteria setter, for setting access criteria for at least one of the wireless device and applications running on the wireless device and a query formulator, for formulating at least one query by one of the applications running on the wireless device. The wireless device also includes a sender, for sending the query over the wireless network and a receiver, for receiving data in response to the query. The data received by the receiver is based on the access criteria and the access criteria relate to an access of the wireless device to the wireless network.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF PREFERRED EMBODIMENTS

The present invention is directed to software applications and systems that allow for controls to be placed on the type and amount of data received based on access criteria. Those controls are important in that they allow the end user or the device to control the amount of data received from or sent to the wireless network that the system will process and display. As discussed below, the controls can be implemented in many embodiments depending on how the wireless devices and network are setup.

Figure 1:
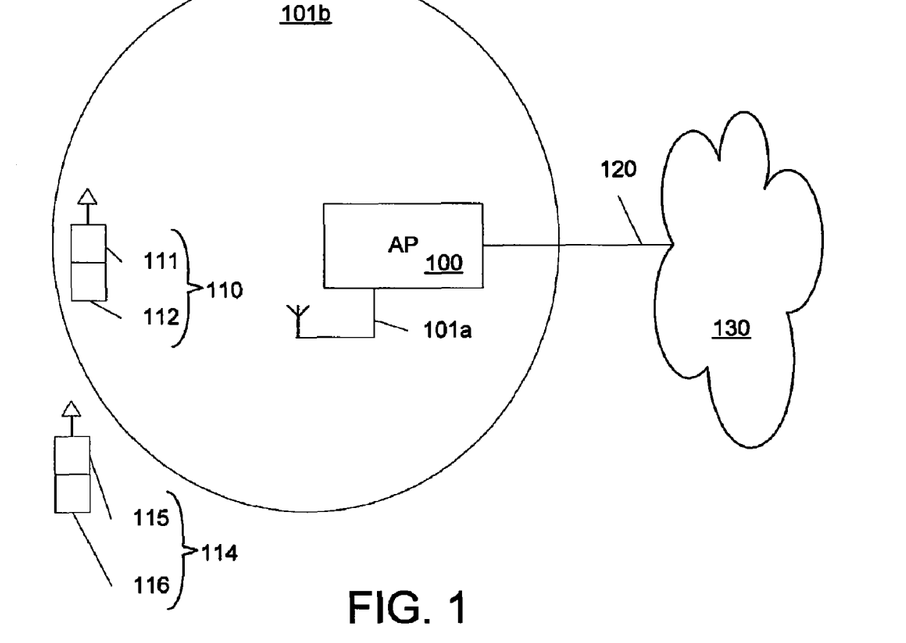
FIG. 1 is a schematic representation of multiple wireless devices in and near the range of the wireless access point, according to one embodiment of the present invention.

One such wireless network and wireless devices are illustrated in FIG. 1, with the access point 100 having an antenna 101a to produce an access area 101b. The access point 100 provides network access for the device 110 that is in the access area 101b. One section of the device, 111, controls the wireless access of the overall device and handles the sending and receipt of data. Another portion of the device, has a user interface 112 and presents data to a user. The access point 100 also has a connection 120 to a larger network 130, such as the Internet, to allow for the device 110 to send data to and receive data from the larger network 130.

One benefit of controls on the data exchanged, according to the present invention, becomes clear when a device moves out of the access area 101b, such as device 114, having access 115 and user interface 116 sections. The device 114 may still have access to the larger overall network, such as a wireless telephone connection, but the data rate for the other access is usually slower. For the latter device 114, that access may still be wireless and may be through services such as Global System for Mobile Communications or General Packet Radio Service. In the latter case, the present invention allows for applications providing data to the user through the user interface 116 to take into account the slower data rate.

Figure 2:
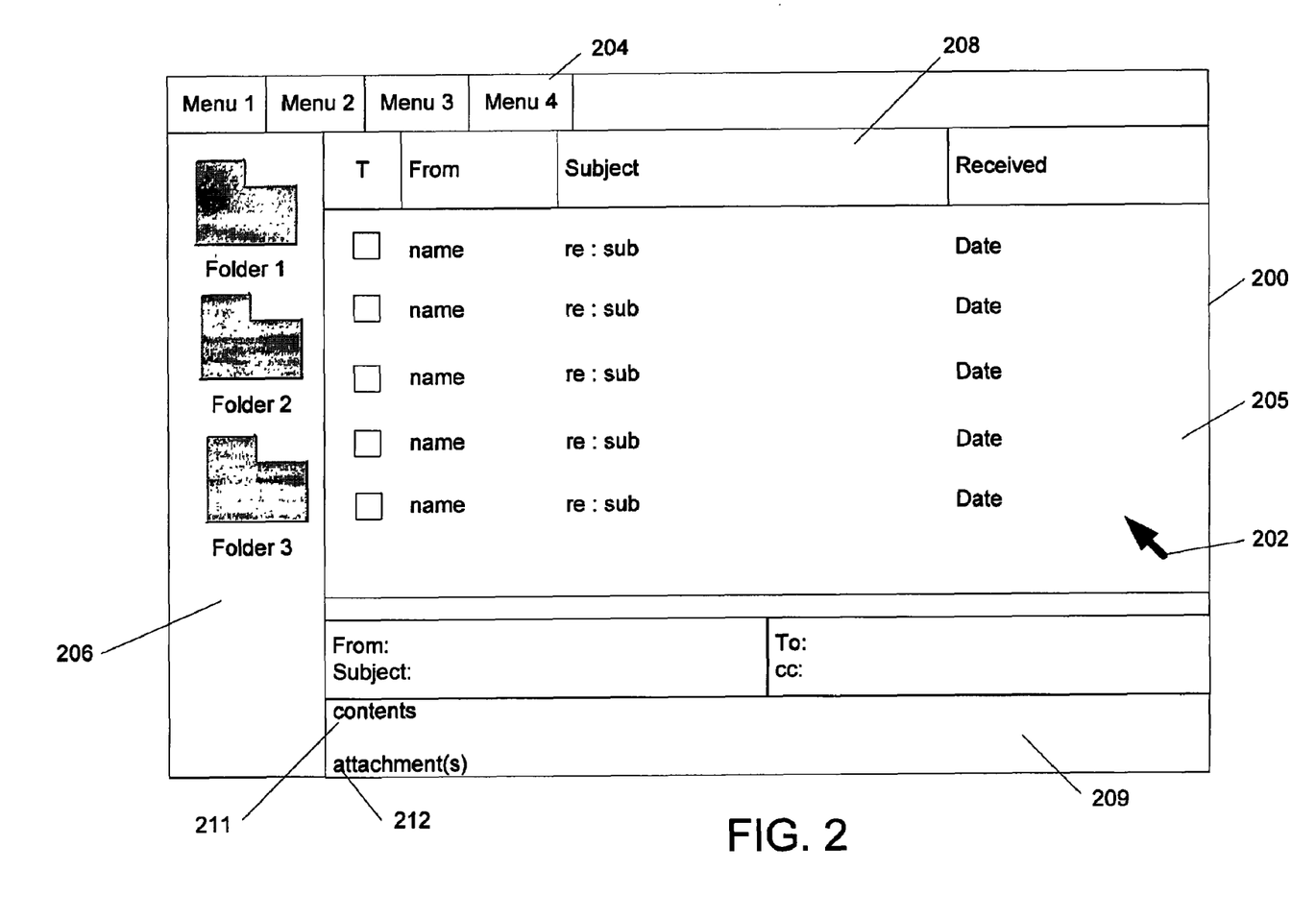
FIG. 2 illustrates a user interface for an email software application, according to one embodiment of the present invention.

Embodiments of the present invention allow for applications to consider additional aspects of the access environment. One particular embodiment is an email application running on the wireless device that implements different functions based on the data rate of the wireless access. An exemplary screenshot is illustrated in FIG. 2, with the screen 200 illustrating a user interface of the email program. The email program may have various menus 204 for accessing the functions of the email application through the use of a cursor or arrow 202. The application may have the ability to save received messages 206 and can send and receive email messages. Received messages can be displayed in a section 205 and can be viewed in a number of formats. An email message can contain a sender's name, a subject line 208, a time and date indicating when the message was sent, a list of persons to whom the message was sent, a contents section 211 and file attachments 212 to the email message.

In the above example, the email application may determine that the device has network access at the lower data rate, and subsequently transfer data related to only the subjects of the email messages. Thus, the user would not have to wait for the full messages or attachments to the emails to be downloaded to determine what email messages have been received. Subsequently, when the user and the wireless device enters into a different access area or the data rate increases in the first access area, the rest of the messages can be downloaded and new messages may be downloaded in their entirety.

Figure 3:
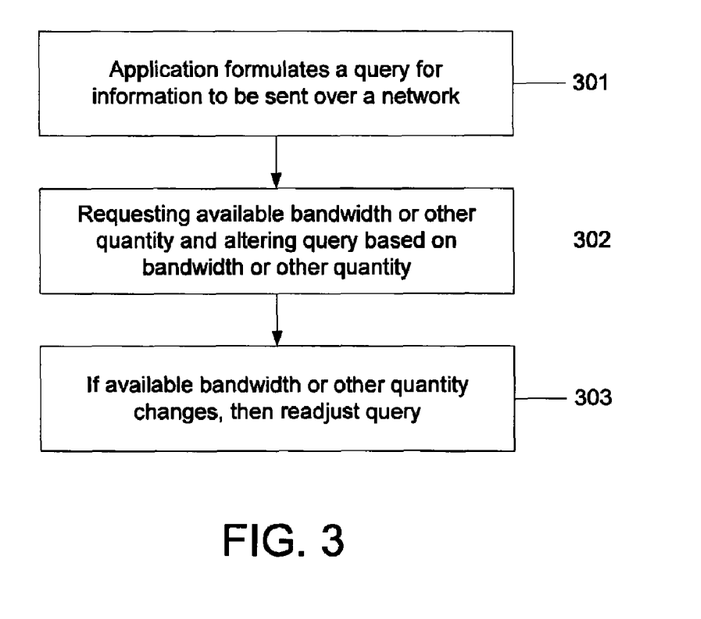
FIG. 3 illustrates a flowchart of the process of modulating access of the wireless device, according to one embodiment of the present invention.

The general process, in one embodiment, follows the flowchart illustrated in FIG. 3. In step 301, the application formulates a query for information to be sent over the network. The application requests information about the available bandwidth or other quantity and alters the information query based on the information received from the device system 302. The altered query is transmitted and the type of data requested is received. If the bandwidth were low, then the data received would include only the sender and subject information, along with the time and date that the message was sent. The application continues to monitor the available bandwidth or other quantity to determine if any change occurs and whether the queries should be readjusted.

Figure 4:
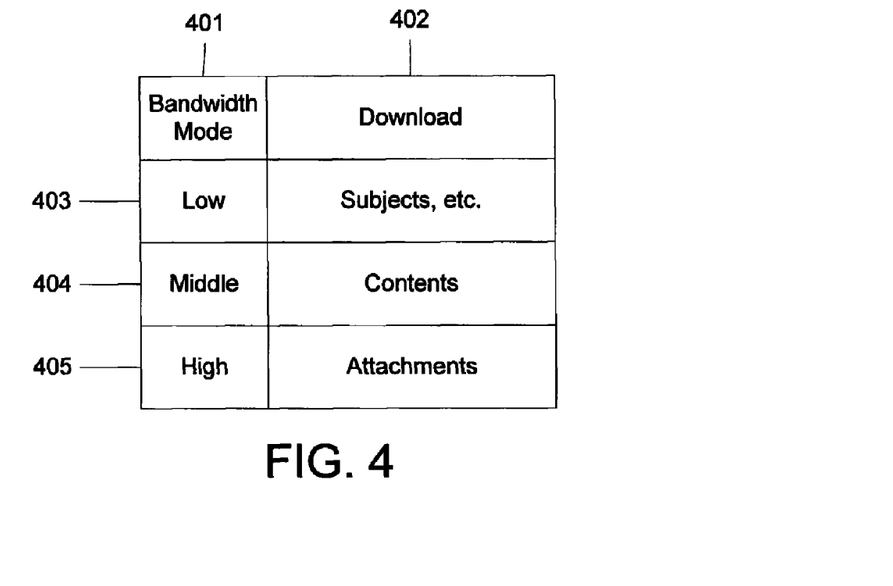
FIG. 4 illustrates an example of access modes and what type of data may be exchanged with the network for each of those modes, according to one embodiment of the present invention.

The present invention would also allow for the applications to download all aspects of the email messages when the data rate of access reaches a predetermined acceptable level. The modes 401 of bandwidth use that can be used by the application are illustrated in FIG. 4, according to one embodiment of the present invention. The three modes illustrated, low 403, middle 404 and high 405, allow for various amounts or types of data 402 to be downloaded from the network. Additionally, the data rate criteria could be set by a user, determined and set by the application or system based on use, or be set to predetermined values used for the device.

Other quantities that information may be requested about could include the type of access point that is being accessed or based on the operator of the access point. Such information may be important to the user if the user has an account with a given operator and would need to pay more for greater access to another operator. Such controls would also be important such that certain types of access points could excluded from requiring the additional data transfer and potentially save the use access fees based on usage.

Figure 5:
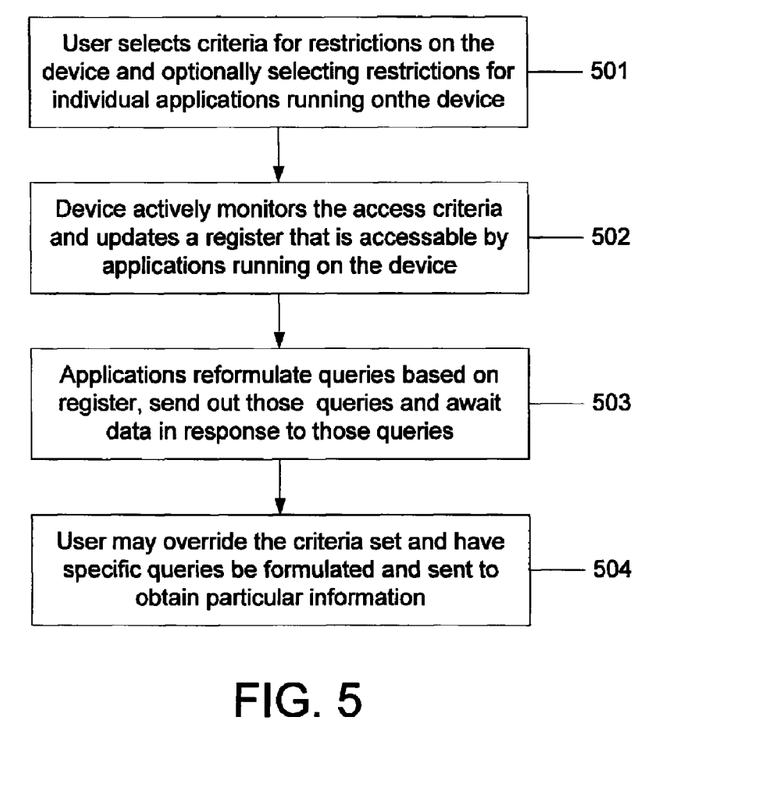
FIG. 5 illustrates a flowchart of the process of controlling access by a wireless device, according to an alternate embodiment of the present invention.

An alternate embodiment of the present invention is illustrated in FIG. 5. In this embodiment, a user of the device selects the criteria for controls on the device and/or selects criteria separately for the individual applications running on the device 501. This may be important if a user wishes to restrict high bandwidth usage for certain applications and fewer controls on other applications. The device then actively monitors the access criteria selected by the user, such as the data rate of network access, and updates a register that is utilized by the application running on the device 502. In this embodiment of the present invention, the applications reformulate information queries, such as email requests, based on the register values 503. The reformulated information queries are sent out to the network and data based on those queries are received and processed. The user is also allowed to make specific requests, overriding the criteria set, if particular information is needed 504. For example, if a user requests email messages under a low bandwidth mode, and has a particular interest in a specific message, the entire message could be downloaded even though the email application is operating under the low bandwidth mode.

Additionally, the controls may be staged such that synchronization of later received data can occur with previously received data. An example of such a function would be when the device is in a mode such as a "cellular" mode and only downloads title or subject lines of emails. Once the device 110 enters the access area 101a, the remaining portions of the emails would be received and all parts of the emails are recombined and synchronized for the user. Alternatively, the device could continue to download data to be synchronized with previously received data in the background while there is an active access request pending.

As discussed in the embodiments above, either the application itself or the system controlling the operation of the wireless device modulates a query based on the access criteria. In other words, for the email example discussed, either the email application program reformulates the request for new mail messages, based on the bandwidth mode or the system software reformulates the request from the email application program so that the request comports with the bandwidth mode. It is noted that the present invention is not so limited.

Figure 6:
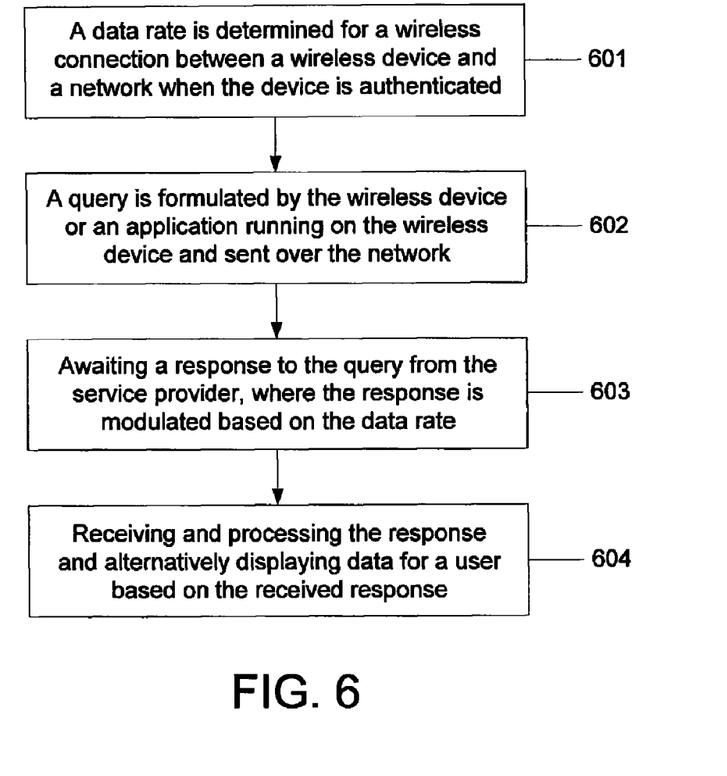
FIG. 6 illustrates a flowchart of the process of controlling access by a wireless device, according to another embodiment of the present invention.

Additionally, the present invention is also applicable to embodiments where a service provider alters the information forwarded to the wireless device based on access criteria. In this latter embodiment, the process illustrated in FIG. 6, access criteria, such as a data rate, are determined for the wireless connection between the wireless device and the network, in step 601. The wireless device or the application program running on the wireless device would then formulate a query and send the query over the network, in step 602; in the case of email applications that may be a request for new messages. The wireless device then awaits a response to the query, in step 603. The service provider would send a modulated response based on the access criteria, such as the data rate. It is noted that this service provider may be at the level of the immediate wireless network, such as the access point 100, illustrated in FIG. 1, or may be at other levels, such as a service provider that coordinates access to the larger network 130. In the case of an email application, the service provider then chooses to send only a portion of the new messages because of the bandwidth mode of the wireless device. That bandwidth mode can be detected at the time that the wireless connection was authenticated and can be updated to take into account changes in access of the wireless device. The wireless device receives and processes the response and may display information related to the received response, in step 604. In the case of an email application, the email application would display only the email message titles received to the user. Alternatively, the user would have the option of requesting the full message based on the partial data received.

Figure 7:
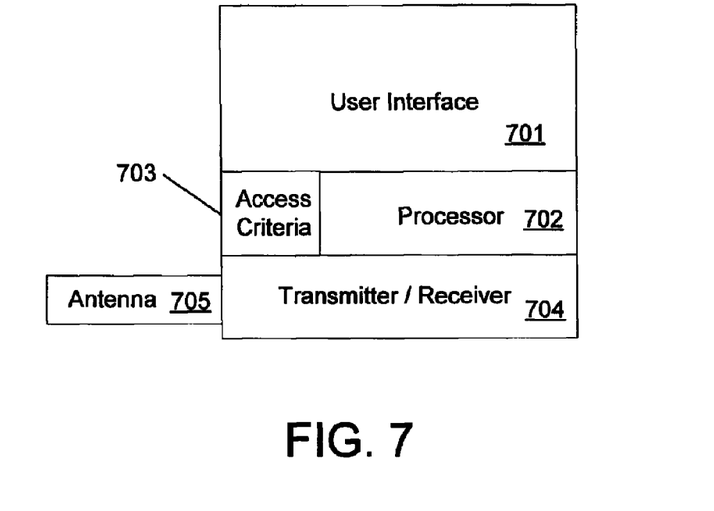
FIG. 7 illustrates a block diagram illustrating a wireless device, according to one embodiment of this invention.

FIG. 7 provides a general block diagram of the wireless device according to one embodiment of the present invention. The wireless device has a user interface 701 that supplies information to the user of the wireless device. The information displayed may relate to data received from the network or may be related to process carried out by the wireless device by itself. The information provided on the user interface 701 is coordinated by the processor 702, where the processor also acts with the transmitter and receiver 704 to send and receive data over the network through the antenna 705. The access criteria 703 portion stores the access criteria for the wireless device. In some embodiments discussed above, the access criteria 703 may not be actively accessed, such being the case where the service provider for the network determines and sets the access criteria.

While the examples of the present invention have focused on an email application as an exemplary software application, the present application is not so limited. The software applications may be any application that may use network access. These applications may include browsers, streaming media controllers and Internet messaging applications. In addition, while restrictions on the amount and types of data that can be transferred based on access criteria have been discussed, it is also noted that the access criteria may be setup such that certain types of application or data downloads may not be allowed to occur based on the criteria. As an example, the access criteria may be setup so that streaming of video cannot occur unless a certain bandwidth criterion is met or surpassed.

Additionally, in other embodiments, other types of criteria can be applied to optimize the access of the portable wireless device. The present invention is also applicable to allow data having a specific quality of service to be received by the portable wireless device. Thus, data have a high quality of service, such as, as an example, voice-over-IP, may be transmitted and received by the portable wireless device and data having a lower quality of service would not. Additionally, as discussed above with respect to email applications, different types of data may be "refused" by the portable wireless device. Examples of the types of data may include text, video, audio, messaging data. Also, as discussed above, portions of the above data types may be downloaded in "the background", as opposed to being rejected outright. Thus, if the portable wireless device's access does not meet the predefined criteria, then audio data would not be immediately transferred but would be downloaded at a slower rate.

Also, in addition to the restrictions on the types of data, other aspect of the data transferred can be altered. In the example of video data, the present invention also allows for data to be transformed such that the frame rate for the video is reduced to achieve a proper presentation of the video at the prescribed data rate. Similarly, audio data transferred can range in terms of its level of quality, from CD-quality to lower quality, such that the audio data can be delivered at a rate that is manageable by the portable wireless device at its access data rate. Also, when a image file, such as a jpeg-file, is being transferred, the size of the jpeg-file can be altered or an alternate, smaller-sized jpeg-file can be selected to meet the access data rate of the device.

The above-discussed configuration of the invention is, in one embodiment, embodied on a semiconductor substrate, such as silicon, with appropriate semiconductor manufacturing techniques and based upon a circuit-layout, which would, based upon the embodiments discussed above, be apparent to those skilled in the art. A person of skill in the art with respect to semiconductor design and manufacturing would be able to implement the various modules, interfaces, and components, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate. Additionally, the present invention can be implemented totally or partially through software.

In addition, while the term packet has been used in the description of the present invention, the invention has import to many types of network data. For purposes of this invention, the term packet includes packet, cell, frame, datagram, bridge protocol data unit packet, packet data and any equivalents thereof.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A wireless device receiving data through a wireless network, said wireless device comprising:
    an access criteria setter configured to set access criteria for at least one of the wireless device and applications running on the wireless device;
    a query formulator configured to formulate at least one query by one of the applications running on the wireless device;
    a sender configured to send the query over the wireless network; and
    a receiver configured to receive data in response to the query,
    wherein the data received is based on the access criteria and the access criteria relate to an access of the wireless device to the wireless network.

2. A wireless device as recited in claim 1, wherein said access criteria setter comprises a register setter configured to set a wireless device register based on the access of the wireless device to the wireless network, and
    said query formulator comprises a register query formulator configured to formulate the at least one query based on contents of the wireless device register.

3. A wireless device as recited in claim 1, further comprising:
    a query reformulator configured to reformulate the at least one query based on the access criteria; and
    wherein said sender comprises a second sender configured to send the reformulated query over the wireless network.

4. A wireless device as recited in claim 1, wherein said receiver comprises a second receiver configured to receive modified data in response to the query, and
    the modified data is modified by a sender based on a detected access of the wireless device to the wireless network detected by the sender.

5. A wireless device as recited in claim 1, wherein said formulator comprises an application query formulator configured to formulate at least one query by at least one of an email application, a browser application, a streaming media application, and a network messaging application.

6. A wireless device as recited in claim 5, wherein
    said one of the applications running on the wireless device comprises the email application, and
    said receiver comprises an email receiver configured to receive at least a portion of an email message based on the access criteria.

7. A wireless device as recited in claim 1, wherein said access criteria setter comprises a second access criteria setter configured to set access criteria based on a data rate between the wireless device and the wireless network.

8. A wireless device as recited in claim 1, wherein said access criteria setter comprises a second access criteria setter configured to set access criteria based on a type of data transferred between the wireless device and the wireless network.

9. A wireless device as recited in claim 1, wherein said access criteria setter comprises a second access criteria setter configured to set access criteria based on a provider of network service providing the wireless network.

10. A wireless device as recited in claim 1, wherein said access criteria setter comprises a second access criteria setter configured to set access criteria based on a use of the wireless device over a predetermined period of time.

11. A wireless device as recited in claim 1, wherein said access criteria setter comprises a second access criteria setter configured to set access criteria for each application running on the wireless device separately.

12. A wireless device as recited in claim 11, wherein said second access criteria setter comprises a third access criteria setter configured to set access criteria for each application based on a use of each application running on the wireless device over a predetermined period of time.

13. A wireless device for receiving data through a wireless network, said wireless device comprising:
    setting means for setting access criteria for at least one of the wireless device and applications running on the wireless device;
    formulating means for formulating at least one query by one of the applications running on the wireless device;
    sending means for sending the query over the wireless network; and
    receiving means for receiving data in response to the query,
    wherein the data received is based on the access criteria and the access criteria relate to an access of the wireless device to the wireless network.

14. A wireless device as recited in claim 13, wherein said setting means is configured to set a wireless device register based on the access of the wireless device to the wireless network, and
    said formulating means is configured to formulate the at least one query based on contents of the wireless device register.

15. A wireless device as recited in claim 13, further comprising:
    reformulating means configured to reformulate the at least one query based on the access criteria,
    wherein said sending means is configured to send the reformulated query over the wireless network.

16. A wireless device as recited in claim 13, wherein
    said receiving means is configured to receive modified data in response to the query, and
    the modified data is modified by a sender based on a detected access of the wireless device to the wireless network detected by the sender.

17. A wireless device as recited in claim 13, wherein said formulating means is configured to formulate at least one query by at least one of an email application, a browser application, a streaming media application, and a network messaging application.

18. A wireless device as recited in claim 17, wherein said one of the applications running on the wireless device comprises the email application, and
    said receiving means is configured to receive at least a portion of an email message based on the access criteria.

19. A wireless device as recited in claim 13, wherein said setting means is configured to set access criteria based on a data rate between the wireless device and the wireless network.

20. A wireless device as recited in claim 13, wherein said setting means is configured to set access criteria based on a type of data transferred between the wireless device and the wireless network.

21. A wireless device as recited in claim 13, wherein said setting means is configured to set access criteria based on a provider of network service providing the wireless network.

22. A wireless device as recited in claim 13, wherein said setting means is configured to set access criteria based on a use of the wireless device over a predetermined period of time.

23. A wireless device as recited in claim 13, wherein said setting means is configured to set access criteria for each application running on the wireless device separately.

24. A wireless device as recited in claim 23, wherein said setting means is configured to set access criteria for each application based on a use of each application running on the wireless device over a predetermined period of time.

25. A process of receiving data by a wireless device through a wireless network, said process comprising:
  setting access criteria for at least one of the wireless device and applications running on the wireless device;
  formulating at least one query by one of the applications running on the wireless device;
  sending the query over the wireless network; and
  receiving data in response to the query,
  wherein the data received is based on the access criteria and the access criteria relate to an access of the wireless device to the wireless network,
  and wherein said step of setting access criteria comprises setting a wireless device register based on the access of the wireless device to the wireless network and said step of formulating at least one query comprises formulating the at least query based on contents of the wireless device register.

26. A process of receiving data by a wireless device through a wireless network, said process comprising:
  setting access criteria for at least one of the wireless device and applications running on the wireless device;
  formulating at least one query by one of the applications running on the wireless device;
  reformulating the at least one query based on the access criteria;
  sending the query over the wireless network, wherein said step of sending the query comprises sending the reformulated query over the wireless network; and
  receiving data in response to the query,
  wherein the data received is based on the access criteria and the access criteria relate to an access of the wireless device to the wireless network.

27. A process of receiving data by a wireless device through a wireless network, said process comprising:
  setting access criteria for at least one of the wireless device and applications running on the wireless device;
  formulating at least one query by one of the applications running on the wireless device;
  sending the query over the wireless network; and
  receiving data in response to the query,
  wherein the data received is based on the access criteria and the access criteria relate to an access of the wireless device to the wireless network,
  wherein said step of setting access criteria comprises setting the access criteria by a sender of data in response to the at least one query, and said step of receiving data in response to the query comprises receiving modified data in response to the query, and wherein the modified data is modified by the sender based on a detected access of the wireless device to the wireless network detected by the sender.

28. A process of receiving data by a wireless device through a wireless network, said process comprising:
  setting access criteria for at least one of the wireless device and applications running on the wireless device;
  formulating at least one query by one of the applications running on the wireless device;
  sending the query over the wireless network; and
  receiving data in response to the query,
  wherein the data received is based on the access criteria and the access criteria relate to an access of the wireless device to the wireless network,
  wherein said step of setting access criteria comprises setting access criteria based on a data rate between the wireless device and the wireless network.

* * * * *